(12) United States Patent
Adams (10) Patent No.: US 7,083,036 B2
(45) Date of Patent: Aug. 1, 2006

(54) APPARATUS AND METHOD FOR SECURELY MONITORING THE SALES TRANSACTIONS OF BULK VENDING MACHINES

(75) Inventor: Christopher Adams, Bellmore, NY (US)

(73) Assignee: Coinstar Entertainment Services Inc., Bellevue, WA (US)

( * ) Notice: Subject to any disclaimer, the term of this patent is extended or adjusted under 35 U.S.C. 154(b) by 80 days.

(21) Appl. No.: 10/458,576

(22) Filed: Jun. 9, 2003

(65) Prior Publication Data

US 2004/0056085 A1   Mar. 25, 2004

Related U.S. Application Data

(60) Provisional application No. 60/388,076, filed on Jun. 11, 2002.

(51) Int. Cl.
*G06M 1/27* (2006.01)
(52) U.S. Cl. .................. 194/223; 194/219; 194/230; 194/239; 700/236
(58) Field of Classification Search .................. 377/7; 221/7; 453/32; 194/202, 219, 223, 230, 194/220, 231, 235–245, 255, 292; 700/236, 700/237, 241, 244
See application file for complete search history.

(56) References Cited

U.S. PATENT DOCUMENTS

| 3,669,235 A | 6/1972 | Breeden |
| 3,894,220 A | 7/1975 | Levasseur |
| 4,031,991 A * | 6/1977 | Malott ................. 194/217 |
| 4,359,147 A | 11/1982 | Levasseur |
| 4,741,426 A | 5/1988 | Koch |
| 4,976,346 A | 12/1990 | Juds et al. |
| 5,091,713 A | 2/1992 | Horne et al. |
| 5,109,972 A * | 5/1992 | Van Horn et al. .......... 194/217 |
| 5,339,937 A | 8/1994 | Bolen |
| 5,442,348 A * | 8/1995 | Mushell .................. 340/932.2 |
| 5,909,795 A | 6/1999 | Porco |
| 5,930,771 A | 7/1999 | Stapp |
| 5,950,794 A | 9/1999 | Porco |
| 5,963,452 A | 10/1999 | Etoh et al. |
| 6,050,385 A | 4/2000 | Nikolayev |
| 6,062,370 A | 5/2000 | Nikolayev |
| 6,290,049 B1 | 9/2001 | Nikolayev |

* cited by examiner

*Primary Examiner*—Donald P. Walsh
*Assistant Examiner*—Jeffrey A. Shapiro
(74) *Attorney, Agent, or Firm*—Perkins Coie LLP (57) ABSTRACT

An apparatus for securely monitoring the sales transactions in bulk vending machines, said apparatus comprising at least one bulk vending machine having a coin mechanism. The coin mechanism includes a coin plate; a selectively rotatable shaft extending radially therefrom; a coin shuttle, a cam-bearing lobe and a coin mechanism adapter plate co-axially and collectively located around the selectively rotatable shaft; and a first switch and a second switch. The first and second switches are fixedly mounted and oriented on the coin mechanism adapter plate so that the maximum amount of backlash in the coin mechanism is less than the angular spread of the switches. The coin mechanism further includes a microprocessor having a sales counter; and means for communicatingly connecting the first and second switches to said microprocessor, whereby the microprocessor will advance the sales counter one numeric count and record a single vend only after the cam-borne lobe contacts and completely closes both first and second switches, when it is rotated as a result of a coin deposited in the coin mechanism.

34 Claims, 4 Drawing Sheets

APPARATUS AND METHOD FOR SECURELY MONITORING THE SALES TRANSACTIONS OF BULK VENDING MACHINES

CROSS REFERENCE TO RELATED PROVISIONAL APPLICATION

This application claims the benefit of U.S. Provisional patent application No. 60/388,076 filed on Jun. 11, 2002.

BACKGROUND OF THE INVENTION

1. Field of the Invention

The present invention relates to the field of bulk vending machines, and more particularly, to a tamper proof apparatus and method for securely recording and monitoring the sales transactions of bulk vending machines.

2. Related Art and Prior Art Statement

Vending machines and bulk vending machines are known in the art. The term, vending machine, is normally associated with machines which give the customer the opportunity to select from a variety of items such as chips, candy, pretzels, gum, soda and the like. The term, bulk vending machines, in turn, is normally associated with a machine with holds large quantities of a particular product and does not give the customer a choice between the goods to be selected. Both vending machines and bulk vending machines are normally operated with coins.

Bulk vending machines are used for the automatic dispensing of a wide variety of products, such as gum balls, nuts, and candy. These vending machines come in different shapes and sizes. They are typically fitted with a clear glass or plastic compartment which retains the product to be vended. The typical bulk vending machine also has a coin mechanism for the receipt of payment for the product discharged. In operation, the customer places coins into the coin mechanism of the bulk vending machine, turns the handle on the machine, and one or a handful of the items in the machine are dispensed down a chute for receipt by the customer. The vending machine also contains a storage compartment where the coins are retained until retrieval.

Bulk vending machines transact one sale at a time, at a set price. Furthermore, bulk vending machines tend to be stored in remote locations to provide for the sale of merchandise at all hours, without requiring the presence of a sales person. This means that they are subject to vandalism and to tampering by the buyers of the goods dispensed thereby. In addition, someone has to monitor the sales and collect the money. Accordingly, vending companies typically employ individuals called routers, who are responsible not only for periodically restocking the supply of goods, but also for monitoring sales and retrieving the money from the machines.

The process of monitoring inventory, and calculating, tracking and recording the total revenues for each machine in each location is tedious, time-consuming and subject to both human error and fraud. The router has to travel to each location, collect the money from each machine, keep an accurate total of the money collected from each machine, evaluate his inventory of goods for each machine and decide on the amounts necessary to replenish said inventory. The router also has the responsibility of associating the money to a particular machine in a particular location and of doing so in an honest and accurate manner.

Many of the establishments, where the bulk vending machines are placed, receive a percentage of the revenues collected. In these situations, the store manager may supervise the collection of such revenues from the machine. It is not uncommon for the store manager and the router to divert a portion of the money to themselves. Consequently, the vending company is at the mercy of the router and the store manager.

As a partial solution to this problem, some vending machines can be purchased or otherwise equipped with a counter to count vending transactions. The vending company can then compare the accumulated count from the counter with receipts collected by his employees from time to time to ascertain the accuracy with which the employees are collecting and submitting such funds. Such counters however, are usually easily temporarily disconnected by a dishonest individual who wishes to make the vending machine appear to be making fewer sales than in fact it is, thereby allowing him to divert revenues from the hidden sales to himself. Furthermore, such counters are vulnerable to buyer tampering and vandalism particularly in remote area locations.

In the prior art, U.S. Pat. No. 4,741,426 discloses a coin acceptor having first and second members initially spaced apart from one another and frictionally carrying a third member having a coin selectively positioned thereon. Moving the first and second members toward one another causes relative displacement between the third member and the first and second members, which is then compared with a referenced position. Such coin acceptor utilizes sliding friction in order to determine whether a proper coin or coins have been deposited, by comparing the weight of the coins or coins deposited in the vending machine with a referenced standard.

U.S. Pat. No. 5,339,937 discloses an improved coin receiving portion for a bulk vending machine, and a method for operation thereof, for accepting coins of a proper denomination and rejecting coins of other than the proper denomination. The improved coin receiving portion includes a coin wheel having a hub for connecting to a handle for operating the coin receiving portion to dispense bulk product and a first slot in the coin wheel for receiving and retaining therein a coin of a proper denomination and for receiving and expelling therefrom coins of other than the proper denomination through a second slot that passes through at least a portion of the hub.

U.S. Pat. No. 4,976,346 discloses a means of determining whether a counter has been disconnected, and for preferably responding in a way that will likely induce the individual to reconnect the counter and cease his dishonest activities. Such means includes a coin counter security circuit for use in vending machines having a counter for counting the number of vending transactions. The circuit functions to detect indicia of proper counter operation (and hence that the counter has not been improperly disconnected) and serves to enable the vend transaction when proper counter operation has been so detected. The indicia of proper counter operation can be the detection of a flyback signal normally generated by an inductive element associated with the counter.

U.S. Pat. No. 5,091,713 discloses a monitoring system for monitoring a vending machine at a remote location. Such monitoring system includes an inventory sensing system for providing a continuous update of the inventory in the vending machine, an alarm system to signal when the vending machine is being damaged or the systems in the vending machine are in need of attention, a communication system, and a credit card verification system. The vending machine is coupled to a central computer system which monitors all the systems in the vending machine. The communication system includes a credit card verification system, a two-way communication capability, a display screen, and a printer.

U.S. Pat. No. 5,930,771 discloses an apparatus and method for monitoring inventory in a plurality of coin-operated vending machines. A bar code scanner is used to log inventory into a memory within each vending machine. As merchandise is dispensed, transaction records including the date and time of sale are generated and stored within each vending machine. Denominations of currency tendered by a buyer for each transaction are also stored. At a predetermined time under the control of a processor in cooperation with a real-time calendar-clock within each vending machine, stored information about each vending transaction is transmitted via a cellular telephone interface and modem to a central computer where a statistical analysis of sales for a single vending machine or for predetermined groups of vending machines may be performed. Calls are timed such that no two vending machines are attempting to communicate with the central computer at the same time. Consequently, a single cellular telephone number may be used by all vending machines. Inventory status and change remaining in a vending machine may also be communicated to the central computer.

U.S. Pat. No. 5,963,452 discloses a system for managing sales of goods for vending machines. Such system includes a goods control center, a plurality of vending machines, and terminal computers equipped in the respective vending machines. The goods control center includes a host computer for preparing digital data signals as control instructions, and a frequency moderation sub-carrier broadcasting facility as a transmission facility for outputting the digital data signals. Each vending machine has a receiving facility for receiving the digital data signals from the goods control center, and a responding facility. Each terminal computer receives the digital data signals and selectively extracts the digital data as the control instructions necessary for the vending machine to thereby store the digital data necessary for the vending machine in a memory. Each terminal computer controls the vending machine on a basis of the control instructions stored in the memory, obtains goods market information of the vending machine, and outputs the goods market information to the responding facility for reporting the information to the host computer at the goods control center.

U.S. Pat. No. 6,050,385 (hereinafter "the '385 patent") discloses a bulk vending machine coin mechanism together with a counter combination. The counter/combination has a coin mechanism designed to be partially received into an opening in the bulk vending machine. The coin mechanism comprises a selectively rotatable shaft extending axially therefrom and a coin counter attached to a portion of said coin mechanism within the opening of the bulk vending machine. The counter, in turn, comprises a numeric display and a contact switch assembly comprising a first pair of spaced-apart wires at a first location of the switch assembly, the first pair of wires connected to the numeric display by a lead wire and to a capacitor by another lead wire, a second pair of spaced-apart wires at a second location of the switch assembly, the second pair of wires connected at least to the capacitor by yet another lead wire, a selectively rotatable element having a metal strip attached thereto, the metal strip able to connect both of the wires of both of the first and second pairs of said spaced-apart wires at separate and distinct positions during the selective rotation of the selectively rotatable element, wherein the shaft causes the selectively rotatable element to rotate bringing the metal strip first in contact with the first pair of spaced-apart wires and then in contact with the second pair of spaced-apart wires, thereby causing the counter to advance one sequential count.

There are many problems with the contact switch assembly of the '385 patent. Just like in all the other prior art the vend is recorded at the initial rotation of the cam when the coin is first inserted. It comprises no validation vend sequence. Furthermore, the capacitor can be charged by means other than the switch contacts alone. In addition, the amount of duration for which the switches are on, and the condition of the wire contacts, can charge the capacitor to different degrees. Thus, by jiggling the cam to touch the wire contacts of the switches more than once will charge the capacitor in increments and cause it to record multiple vends after all. Similarly in the discharge, if the cam is moved quickly such that the contact to the discharge contact wire is absolutely minimal and not complete, the capacitor will continue to be partially charged. Thus when it goes to the next vend, the capacitor might think that it is already charged, i.e. it has a partial charge, and not record the new vend.

It is clear from the patents set forth above, a great amount of prior art has been developed in connection with bulk vending machines and the prevention of fraud during the sales transactions conducted thereby. Some of this prior art has been directed to preventing fraud by the buyer of the goods dispensed by the bulk vending machines and some to preventing fraud by the router maintaining the machines. However, none of this prior art has been able to effectively and simultaneously guarantee both the precision and accuracy of the revenues generated by bulk vending machines and kept in their storage compartment, and the concomitant prevention of both fraud by the buyer of the goods dispensed by the bulk vending device and fraud conducted by the router.

OBJECTS OF THE INVENTION

Accordingly, it is an object of the present invention to effectively and simultaneously guarantee both the precision and accuracy of the revenues generated by bulk vending machines and kept in their storage compartment, and the concomitant prevention of both fraud by the buyer of the goods dispensed by the bulk vending device and fraud conducted by the router.

It is a further object of the present invention to provide an apparatus and method for the monitoring of the sales transactions of a bulk vending machine which are tamper proof and almost 100% accurate.

It is yet another object of this invention to provide a vending machine with an improved coin receiving mechanism, which accurately records the number of coins inserted into and the number actual real time vends made by the bulk vending machine.

It is yet another object of this invention to provide a coin mechanism which completely prevents a buyer from tampering with and committing fraud on the bulk vending company by either manually jiggling the coin operating mechanism or by vandalizing the equipment.

It is still another object of the present invention to provide an apparatus and method capable of automatically retrieving sales data from the bulk vending machine in a manner that prevents the operator from tampering either with the actual vends data or the revenue generated therefrom.

These and other objects will become readily apparent from the detailed description of the invention and the drawings that follow below.

SUMMARY OF THE INVENTION

According to the present invention, there is provided a tamper proof method and apparatus for monitoring the sales transaction of vending machines, comprising at least one bulk vending machine having a coin mechanism for monitoring the number of coins inserted into the machines and the number of actual real time vends; a sealed, unassailable microprocessor connected to said coin receiving mechanism; and a portable reader capable of generally only retrieving data from the microprocessor, for the purpose of monitoring vends, total revenues, product activity and inventory.

The coin mechanism in turn comprises a coin plate, a shaft, a handle, a coin shuttle, a lobe bearing cam and a coin mechanism adapter plate. The shaft is axially located through all of the stated elements and secures said elements together through use of threads, bushings and nuts. At the end of the shaft opposite the coin mechanism adapter plate is the handle. The coin mechanism adapter plate is also fixedly mounted onto the coin plate. A vend switch and a clear switch are fixedly mounted on said coin mechanism adapter and oriented so that the maximum amount of backlash in the coin mechanism is less than the angular spread of the switch levers. Finally the coin mechanism also comprises means for communicating with said microprocessor such that no matter how many times the switches are activated during a single vend cycle, the microprocessor records each vend as a completely single transaction.

According to the present invention, the method for monitoring the sales transactions from the bulk vending is directed to preventing buyer fraud on the one hand and router fraud on the other. It comprises the steps of (i) accurately, precisely, and in a tamper-proof manner, recording a single vend via the microprocessor's monitoring of the sequential activation of the vend switch and the clear switch respectively; and (ii) downloading all information in connection with the total number of vends stored in the microprocessor by (a) entering initialization data into the portable reader, (b) connecting the portable reader to the microprocessor, and (c) connecting the portable reader to a printer to obtain a copy of the data.

BRIEF DESCRIPTION OF THE DRAWINGS

While the specification concludes with claims which particularly point out and distinctly claim the present invention, it is believed that the present invention will be better understood from the following detailed description taken in conjunction with the accompanying drawings, in which like reference numerals identify identical elements and wherein:

FIG. 3.

LIST OF ELEMENTS AND THEIR RESPECTIVE IDENTIFYING NUMERALS

| No. | Element |
| --- | --- |
| 10 | Bulk vending machine |
| 12 | coin mechanism |
| 14 | microprocessor |

-continued

LIST OF ELEMENTS AND THEIR RESPECTIVE IDENTIFYING NUMERALS

| No. | Element |
| --- | --- |
| 14a | tamper circuit |
| 16 | portable reader |
| 20 | coin plate |
| 22 | shaft |
| 24 | handle |
| 26 | coin shuttle |
| 28 | cam |
| 30 | lobe |
| 32 | coin mechanism adapter plate |
| 34 | vend switch |
| 36 | clear switch |
| 38 | pawl pivot |
| 40 | pawl |
| 42 | spring |
| 44 | spring mount |
| 46 | portable reader display |
| 48 | keypad |
| 50 | bar code reader |
| 52 | CPU |
| 54 | memory |
| 56 | first input communication port |
| 58 | power source |
| 60 | cable |
| 62 | second communication port |
| 70 | printer |
| 72 | output communication port |

DETAILED DESCRIPTION OF THE INVENTION

Figure 1:
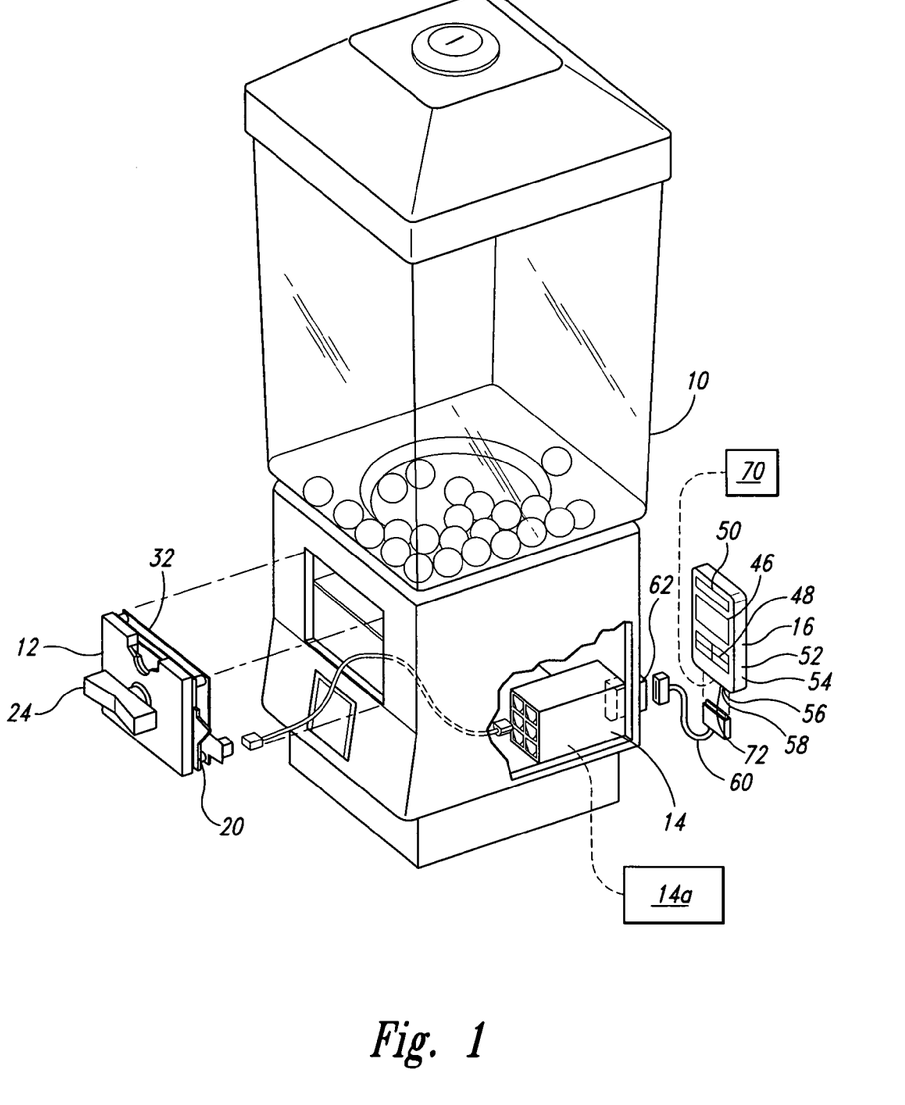
FIG. 1 is a schematic diagram of the apparatus according to the present invention.

There is shown in FIG. 1, the apparatus for monitoring the sales transactions comprising a bulk vending machine 10, containing a coin mechanism 12, in communication with an essentially,non-programmable microprocessor 14. A portable reader 16 is placed in communication with the microprocessor 14, for retrieval and interpolation of all of the sales data contained within the microprocessor 14 as a result of the vends recorded therein.

The coin mechanism 12 in turn comprises a coin plate 20, a shaft 22, a handle 24, a coin shuttle 26, a cam 28 bearing a lobe 30 and a coin mechanism adapter plate 32. The shaft 22 is axially located through all of the afore stated elements and secures said elements together through use of threads, bushings and nuts. At the end of the shaft 22 opposite the coin mechanism adapter plate 32 is the handle 24. The coin mechanism adapter plate 32 is also fixedly mounted onto the coin plate 20. A vend switch 34 and a clear switch 36 are fixedly mounted on said coin mechanism adapter 32 and oriented so that the maximum amount of backlash in the coin mechanism is less than the angular spread of the switch levers. Finally the coin mechanism 12 also comprises means for communicating with said microprocessor such that no matter how many times the switches are activated during a single vend cycle, the microprocessor records each vend as a completely single transaction.

Figure 2:
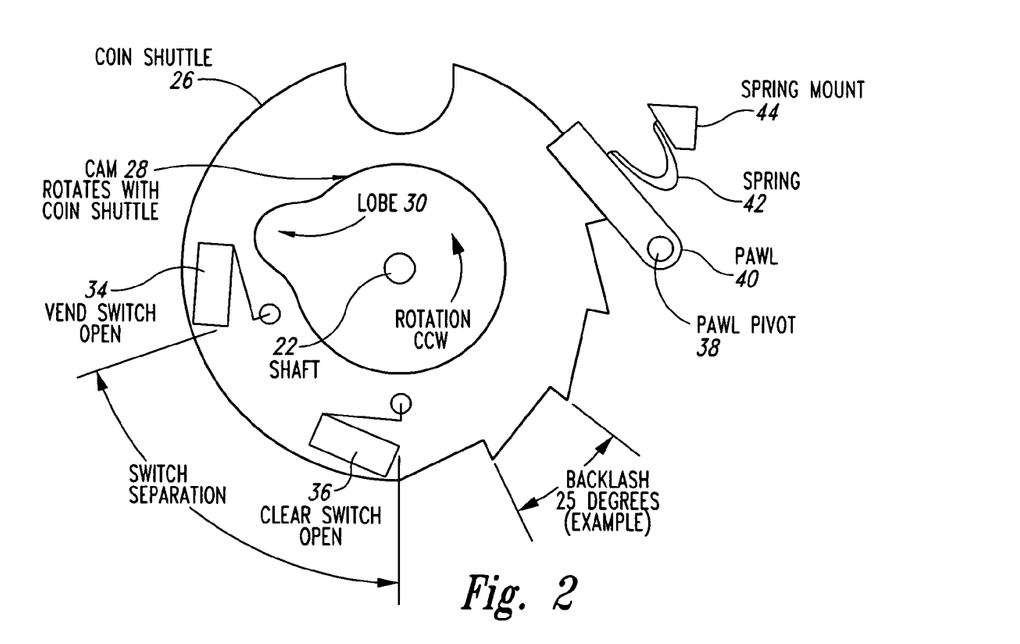
FIG. 2 is a schematic diagram of the inventive coin mechanism.
Figure 3:
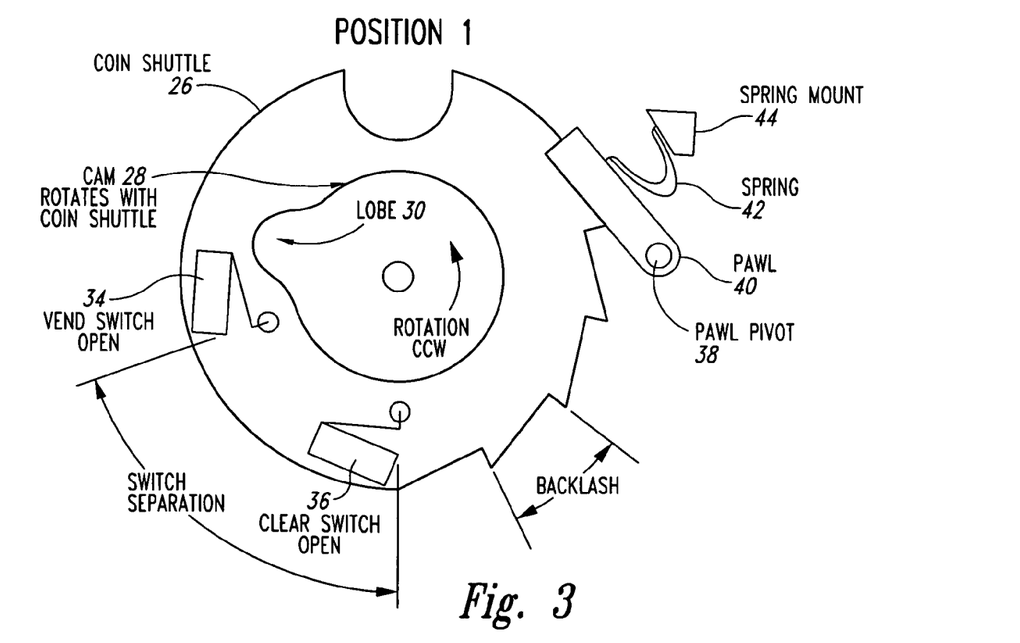
Figure 4:
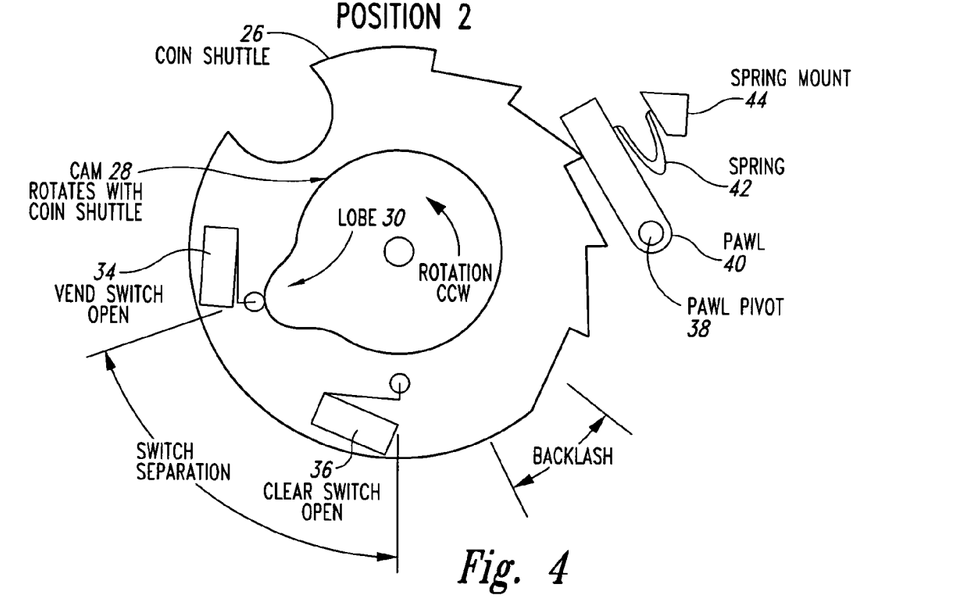
Figure 5:
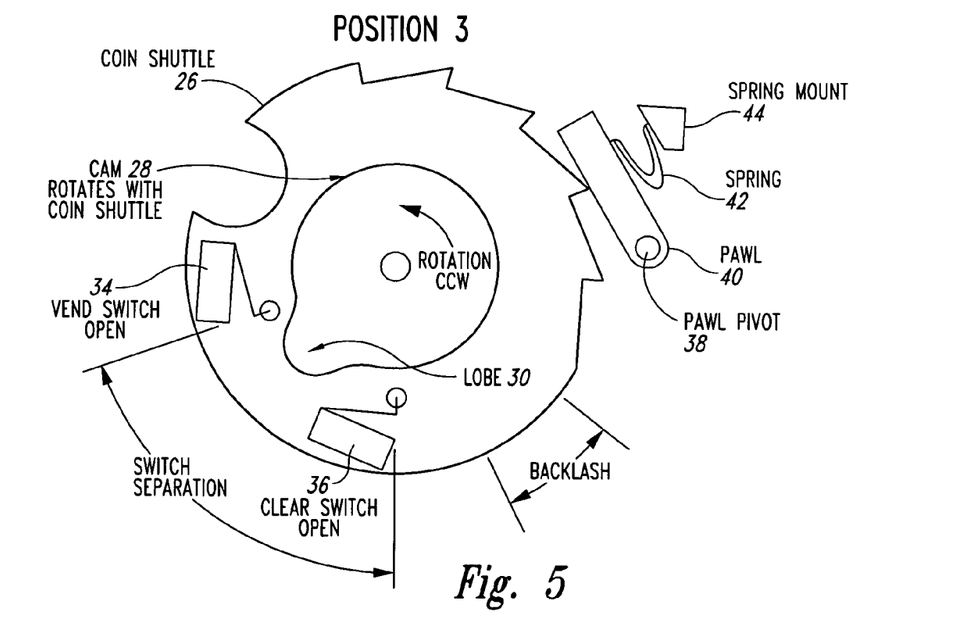
Figure 6:
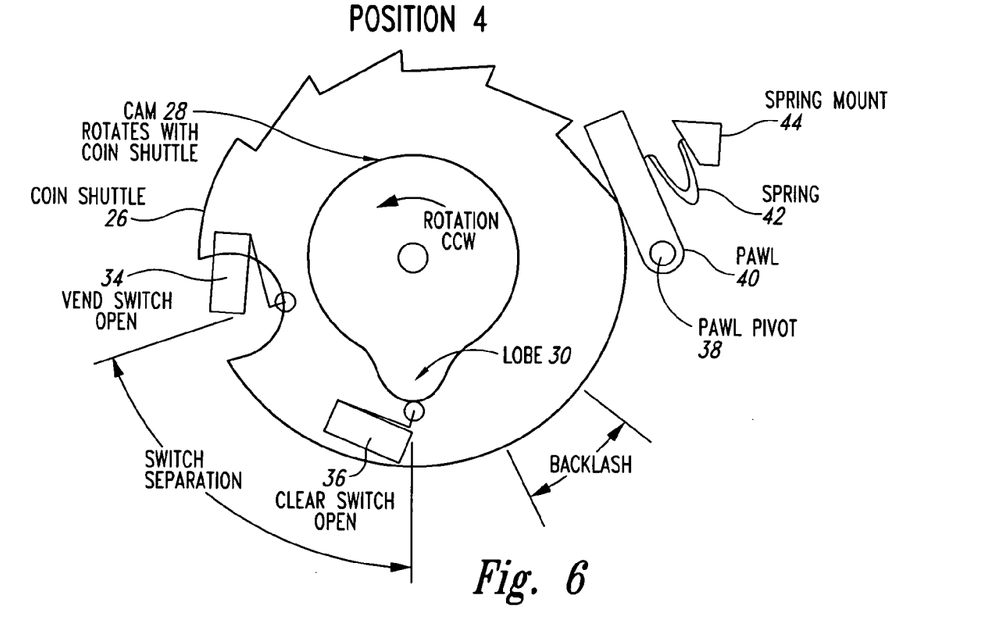
Figure 7:
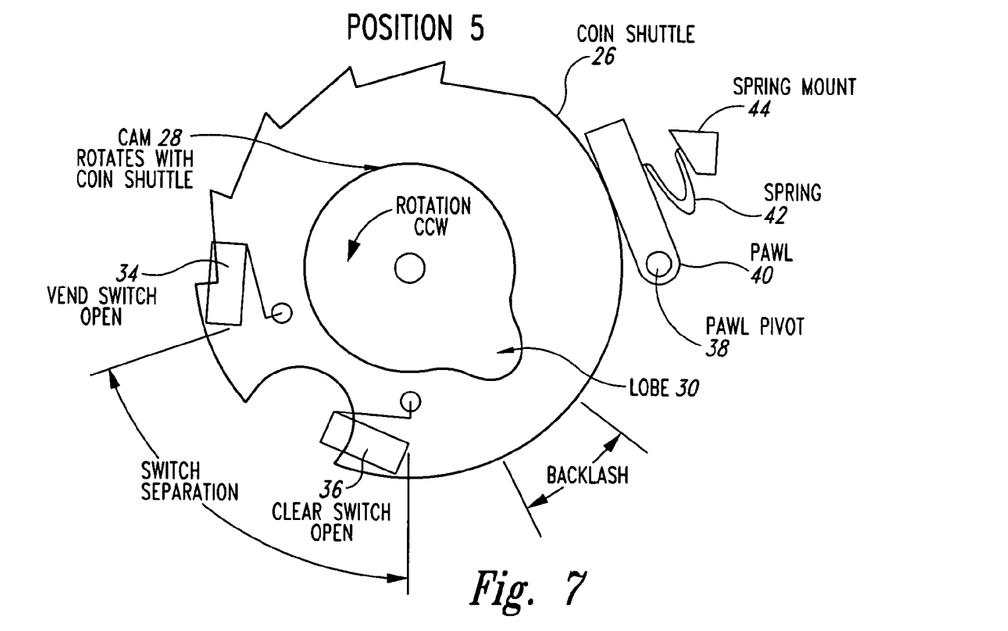
–FIG. 7 are schematic diagrams showing the inventive method of recording a single vend in a stepwise fashion.

FIG. 2 is a schematic of the coin mechanism 12 from a back to front perspective. The coin mechanism in FIG. 2 shows a coin shuttle 26, a lobe-bearing cam 28 coaxially mounted and having a lobe 30; a vend switch 34 and, clear switch 36 fixedly mounted on said coin mechanism adapter plate 32 (not shown); and a pawl pivot 38, a pawl 40, a spring 42, and a spring mount 44.

The vend switch 34 and the clear switch 36 are basic, standard, snap action switches commonly available. They are micro-switches. They have a plunger on top, i.e a button, which when pressed down makes contact with its contact point. They are designed to have their own positive method of making contact. Such contact is driven and achieved with an applied force for a number of reasons, as for example, (i) for self cleaning purposes since every time the contact is made with positive force the tarnish accumulated thereon is removed for a positive connection; (ii) for much better positive connection; and (iii) for easy replacement and maintenance, as switches of this type have a fixed life cycle built into them making it easy to know when they need to be replaced.

The vend switch 34 and the clear switch 36 are in communication with the microprocessor 14 so that every coin inserted and deposited into the coin mechanism 12, and in every sale made as a result of such coin deposit is recorded by the microprocessor as a single vend. The switches 34 and 36 are oriented so that the maximum amount of backlash in the coin mechanism 12 is less than the angular spread of the switch levers. This insures that the cam-borne lobe 30 can only strike the vend switch 34 first and the clear switch 36 second, and at no time can both switches be activated at the same time. Thus, when a coin is inserted into the coin mechanism 12 and the vend switch 34 is activated, no matter how many times the vend switch 34 is activated during a single vend, the microprocessor 14 will only record one contact. When the cam hits the clear switch 36, it is activated and the coin mechanism 12 is reset and ready for the next coin. The clear switch 36 only records one hit per coin. Therefore, no matter how many times the cam hits the clear switch 36, the microprocessor will only record one contact. A complete vend cycle consists of a single vend switch 34 closure and a single clear switch 36 closure. This is the only combination that will be recorded by the microprocessor.

As can be seen from FIG. 3 through FIG. 7 also set forth from a back to front perspective, the method of the computing and recording a single vend using the invention comprises multiple phases. The first phase includes the steps of inserting a coin into the bulk vending machine 10; using the handle 24 to rotate the coin shuttle 26 and the lobe-bearing cam 28 counterclockwise, such that it results in the contacting of the cam-born lobe 30 onto the vend switch 34, causing it to close and to place the microprocessor on alert by starting the vend validation sequence. The vend validation sequence includes the detection of the closed vend switch 34 by the microprocessor and the commencement of the timing part of the sequence simultaneously with the monitoring the status of vend switch. At the end of the timing, i.e. when the time expires, the microprocessor confirms the status of the vend switch 34 and either declares an error and allows the microprocessor to go back to idle if the vend switch is open; or acknowledges the closed state of the vend switch, if the vend switch is in fact closed, and allows the microprocessor to proceed to "the wait for vend switch open state." During the timing step of this first phase, the microprocessor repeatedly checks the status of the vend switch multiple times over a certain period of time, i.e. 3–6 milliseconds. If at the end of the time it has repeatedly confirmed that the vend switch is in fact closed, then the microprocessor recognizes a valid vend event and proceeds to the next phase of the method incorporating the present invention. It must be noted that at no time during this first phase does the microprocessor record the vend.

The next phase comprises the steps of continuing the rotation of the coin shuttle 26 which results in the movement of the cam-born lobe off the vend switch causing it to open, allowing the registering of the open vend switch by the microprocessor and causing the microprocessor to proceed to the "waiting for clear" state. At this time both the vend switch and the clear switch are open. The lobe is in between switches and the microprocessor is waiting for a new event, because it believes that it is in a partial vend. It is actively looking for something to happen i.e. looking for the second switch signal.

The third phase of the inventive method comprises the steps of continuing the rotation of the coin shuttle 26 until such time as the cam-borne lobe 30 contacts the clear switch 36 and causes it to close; detecting the closure of the clear switch 36 via the microprocessor 14; timing such closure for 3–6 milliseconds to confirm that the clear switch 36 is in fact closed; checking the status of the clear switch via the microprocessor at the end of such timing, i.e. when the time expires; and either allowing the microprocessor to go back to "waiting for clear state" if the clear switch is open, or acknowledging the closed state of the clear switch, if the clear switch is in fact closed, and allowing the microprocessor 14 to declare a vend event. During the timing step of this phase, the microprocessor repeatedly checks the status of the clear switch 36 multiple times over a certain period of time, i.e. 3–6 milliseconds. If at the end of the time, it has repeatedly confirmed that the clear switch 36 is in fact closed, then the microprocessor 14 recognizes a valid vend event and proceeds to the next step of the method incorporating the present invention i.e. incrementing the counter associated with the coin mechanism and proceeding to the "waiting for clear switch to open" state. It must be noted that unlike all prior art, the microprocessor does not record the vend event until this third validation phase sequence is completed. This prevents the reading of any false vends due to Electrostatic Discharge Events.

The last phase of the inventive method for the recording of a single vend event, i.e. the "waiting for clear switch to open" state, comprises the steps of continuing the rotation of the coin shuttle 26 causing the coin to drop out of the mechanism and into the coin box and the cam-borne lobe 30 to move off the clear switch 36; allowing the clear switch 36 to open; detecting the opening of the clear switch 36 via the microprocessor 14, returning the microprocessor 14 to the "power save idle" state; rotating the coin shuttle 26 back to normal "at rest position"; dispensing product and readying the unit for another vend sequence.

As can be seen from the above, the microprocessor 14 is programmed to receive the number of vends from the coin mechanism 12. Based on the number of vends, the microprocessor 14 is able to determine the number of sales transactions and the amount of money actually collected from each bulk vending machine. Analysis of the sales data by the microprocessor 14 shows exactly whether the inventory left in the bulk vending machine correlates to the revenues collected therefrom and how well the respective items are selling. Absent such correlation is a clear indication of tampering and fraud.

The router maintaining the bulk vending machine uses a portable reader 16 to collect the data stored within the microprocessor 14. The portable reader 16 is provided with a display 46, a keypad 48, a bar code reader 50, a CPU 52, a memory 54, a first input communication port 56, and a power source 58. The router places the portable reader 16 in communication with the microprocessor 14, and inputs the initialization data. The initialization data is basically and only an identification code for the router operating the portable reader 16, an identification code for the location of the bulk vending machine 10, an identification code for the location of the bulk vending machines within the store, an identification code for the microprocessor 14. Under no circumstances, can the router out on the field, enter any programming commands that are capable of modifying, or altering the information contained and stored in the microprocessor in connection with the total number of vends.

In the preferred embodiment the initialization data is entered using a combination of the key pad 48 and bar code technology. The router, store and microprocessor have an identification tags provided with a bar code identification number. The bar code reader 50 is directed towards the bar code identification number to be input. The reader CPU 52 verifies that a valid identification code has been entered. Identification codes can be entered by keypad as well.

Upon successful entry of the initialization data the router places the portable reader 16 in communication with the microprocessor 14 and enters a command to begin data transmission. In the preferred version, the reader 16 is connected to the microprocessor for communication via a cable 60 connected at one end to the second communication port 62 located on the microprocessor and at the other end to the input communication port of the reader 16. Data transmission can be performed using other known means such as optical or radio frequency signals. The command to begin transmission can be entered via the keypad 48 or a special purpose key or switch.

Upon completion of data transmission from the microprocessor 14 to the reader 16, the reader 16 is disconnected from the microprocessor 14. Next, the reader 16 is placed in communication with a printer 70 via output communication port 72 for transmitting data to the printer 70 for printing.

The microprocessor 14 is equipped with a tamper circuit 14*a* which detects unauthorized operations attempted on the microprocessor 14 by an external entity. Upon detection of tampering the tamper circuit 14*a* locks the microprocessor 14 to prevent it from transmitting data to the reader 16. The tamper circuit 14*a* unlocks the microprocessor 14 to allow transmission of data, only upon receiving an unlock code. The reader 16, while in communication with the microprocessor 14, is capable of receiving an input unlock code which it transmits to the microprocessor 14. Upon reception of the unlock code transmitted by the reader the tamper circuit 14*a* of the microprocessor determines the validity of the unlock code received from the reader 16. Upon a valid determination the tamper circuit 14*a* unlocks the microprocessor 14 and allows transmission of data to the reader 16.

Bench testing and limited field testing have proven and shown that the inventive apparatus and method are 100% accurate. While this system does require some extra wiring to be routed to the switches, it also affords enhanced capabilities, i.e. capability in combination with the microprocessor to sense whether or not the switches are connected to the microprocessor or have been compromised, or whether a switch has been active or not for a very long time. This information in turn can be used to detect tampering, a malfunction such as a stuck switch, or evaluation of a product's sales.

The embodiment described above is provided by way of illustration only and should not be construed to limit the invention. Those skilled in the art will readily recognize various modifications and changes, which may be made to the present invention without strictly following the exemplary embodiment and application illustrated and described herein and without departing from the true scope of the present invention which is set forth in the following claims.

What is claimed is:

1. An apparatus for securely monitoring the sales transactions in bulk vending machines, said apparatus comprising at least one bulk vending machine having a coin mechanism; said coin mechanism comprising a coin plate, a selectively rotatable shaft extending radially therefrom, a coin shuttle, a cam-bearing lobe and a coin mechanism adapter plate co-axially and collectively located around said selectively rotatable shaft; a first switch and a second switch, said first and second switches being fixedly mounted and oriented on said coin mechanism adapter plate so that the maximum amount of backlash in said coin mechanism is less than the angular spread of said switches; a microprocessor having a sales counter; and means for communicatingly connecting said first and second switches to said microprocessor, whereby said microprocessor will advance said sales counter one numeric count and record a single vend only after said cam-borne lobe contacts and completely closes both first and second switches, when said lobe-bearing cam is rotated as a result of a coin deposited in said coin mechanism.

2. The apparatus of claim 1, wherein said first and second switches further comprise switch levers and the maximum amount of backlash in said coin mechanism is less than the angular spread of said switch levers.

3. The apparatus of claim 2, further comprising a portable reader, said portable reader comprising means for becoming communicatingly connected to said microprocessor, downloading, and storing all vend data contained in said microprocessor after the appropriate initialization data and the appropriate transmission commands are inputted into said microprocessor via said portable reader.

4. The apparatus of claim 3, wherein the input into said microprocessor via said portable reader is strictly limited to said initialization data and said transmission commands.

5. The apparatus of claim 3, wherein said microprocessor further comprises a tamper circuit, said tamper circuit being capable of detecting any unauthorized operations on said microprocessor, locking said microprocessor, and allowing said microprocessor to transmit its vend data only after an unlock code is properly entered into said microprocessor via said portable reader.

6. The apparatus of claim 5, wherein the input into said microprocessor via said portable reader is strictly limited to said initialization data, said transmission commands and said unlock code.

7. The apparatus of claim 3, wherein said means for becoming communicatingly connected to said microprocessor and downloading and storing said vend data comprises a power source, a CPU, a memory, a first communication port, a keypad and a display, whereby said power source provides the power to energize said portable reader; said keypad, said CPU and said display operate together for the purpose of entering the appropriate initialization data and transmission commands; and said CPU, said memory and said first communications port operate to download said vend data stored in said microprocessor.

8. The apparatus of claim 7, wherein the input into said microprocessor via said portable reader is strictly limited to said initialization data and said transmission commands.

9. The apparatus of claim 7, wherein said microprocessor further comprises a tamper circuit, said tamper circuit being capable of detecting any unauthorized operations on said microprocessor, locking said microprocessor, and allowing said microprocessor to transmit its vend data only after an unlock code is properly entered into said microprocessor via said portable reader.

10. The apparatus of claim 9, wherein the input into said microprocessor via said portable reader is strictly limited to said initialization data, said transmission commands and said unlock code.

11. The apparatus of claim 3, further comprising printing means communicatingly connected to said portable reader whereby the vend data downloaded from said microprocessor can be printed for review, study and evaluation.

12. The apparatus of claim 11, wherein the input- into said microprocessor via said portable reader is strictly limited to said initialization data and said transmission commands.

13. The apparatus of claim 11, wherein said means for becoming communicatingly connected to said microprocessor and downloading and storing said vend data comprises a power source, a CPU, a memory, a first communication port, a keypad and a display, whereby said power source provides the power to energize said portable reader; said keypad, said CPU and said display operate together for the purpose of entering the appropriate initialization data and transmission commands; and said CPU, said memory and said first communications port operate to download said vend data stored in said microprocessor.

14. The apparatus of claim 12, wherein the input into said microprocessor via said portable reader is strictly limited to said initialization data and said transmission commands.

15. The apparatus of claim 11, wherein said microprocessor further comprises a tamper circuit, said tamper circuit being capable of detecting any unauthorized operations on said microprocessor, locking said microprocessor, and allowing said microprocessor to transmit its vend data only after an unlock code is properly entered into said microprocessor via said portable reader.

16. The apparatus of claim 15, wherein the input into said microprocessor via said portable reader is strictly limited to said initialization data, said transmission commands and said unlock code.

17. The apparatus of claim 13, wherein said microprocessor further comprises a tamper circuit, said tamper circuit being capable of detecting any unauthorized operations on said microprocessor, locking said microprocessor, and allowing said microprocessor to transmit its vend data only after an unlock code is properly entered into said microprocessor via said portable reader.

18. The apparatus of claim 17, wherein the input into said microprocessor via said portable reader is strictly limited to said initialization data, said transmission commands and said unlock code.

19. The apparatus of claim 1, further comprising a portable reader, said portable reader comprising means for becoming communicatingly connected to said microprocessor and downloading and storing all vend data contained in said microprocessor after the appropriate initialization data and the appropriate transmission commands are inputted into said portable reader.

20. The apparatus of claim 19, wherein the input into said microprocessor via said portable reader is strictly limited to said initialization data and said transmission commands.

21. The apparatus of claim 19, wherein said microprocessor further comprises a tamper circuit, said tamper circuit being capable of detecting any unauthorized operations on said microprocessor, locking said microprocessor, and allowing said microprocessor to transmit its vend data only after an unlock code is properly entered into said microprocessor via said portable reader.

22. The apparatus of claim 21, wherein the input into said microprocessor via said portable reader is strictly limited to said initialization data, said transmission commands and said unlock code.

23. The apparatus of claim 19, wherein said means for becoming communicatingly connected to said microprocessor and downloading and storing said vend data comprises a power source, a CPU, a memory, a first communication port, a keypad and a display, whereby said power source provides the power to energize said portable reader; said keypad, said CPU and said display operate together for the purpose of entering the appropriate initialization data and transmission commands; and said CPU, said memory and said first communications port operate to download said vend data stored in said microprocessor.

24. The apparatus of claim 23, wherein the input into said microprocessor via said portable reader is strictly limited to said initialization data and said transmission commands.

25. The apparatus of claim 23, wherein said microprocessor further comprises a tamper circuit, said tamper circuit being capable of detecting any unauthorized operations on said microprocessor, locking said microprocessor, and allowing said microprocessor to transmit its vend data only after an unlock code is properly entered into said microprocessor via said portable reader.

26. The apparatus of claim 25, wherein the input into said microprocessor via said portable reader is strictly limited to said initialization data, said transmission commands and said unlock code.

27. The apparatus of claim 19, further comprising printing means communicatingly connected to said portable reader whereby the vend data downloaded from said microprocessor can be printed for review, study and evaluation.

28. The apparatus of claim 27, wherein the input into said microprocessor via said portable reader is strictly limited to said initialization data and said transmission commands.

29. The apparatus of claim 27, wherein said microprocessor further comprises a tamper circuit, said tamper circuit being capable of detecting any unauthorized operations on said microprocessor, locking said microprocessor, and allowing said microprocessor to transmit its vend data only after an unlock code is properly entered into said microprocessor via said portable reader.

30. The apparatus of claim 29, wherein the input into said microprocessor via said portable reader is strictly limited to said initialization data, said transmission commands and said unlock code.

31. The apparatus of claim 27, wherein said means for becoming communicatingly connected to said microprocessor and downloading and storing said vend data comprises a power source, a CPU, a memory, a first communication port, a keypad and a display, whereby said power source provides the power to energize said portable reader; said keypad, said CPU and said display operate together for the purpose of entering the appropriate initialization data and transmission commands; and said CPU, said memory and said first communications port operate to download said vend data stored in said microprocessor.

32. The apparatus of claim 31, wherein the input into said microprocessor via said portable reader is strictly limited to said initialization data and said transmission commands.

33. The apparatus of claim 31, wherein said microprocessor further comprises a tamper circuit, said tamper circuit being capable of detecting any unauthorized operations on said microprocessor, locking said microprocessor, and allowing said microprocessor to transmit its vend data only after an unlock code is properly entered into said microprocessor via said portable reader.

34. The apparatus of claim 33, wherein the input into said microprocessor via said portable reader is strictly limited to said initialization data, said transmission commands and said unlock code.

* * * * *